March 12, 1963    A. H. FENNELL    3,080,955
ARTICLE POSITIONING CONVEYOR
Filed May 9, 1960    4 Sheets-Sheet 1

INVENTOR.
ALFRED H. FENNELL
BY
Paul A. Weilein
ATTORNEY.

March 12, 1963 — A. H. FENNELL — 3,080,955
ARTICLE POSITIONING CONVEYOR
Filed May 9, 1960 — 4 Sheets-Sheet 2

INVENTOR.
ALFRED H. FENNELL
BY
Paul A. Weilein
ATTORNEY.

March 12, 1963 A. H. FENNELL 3,080,955
ARTICLE POSITIONING CONVEYOR
Filed May 9, 1960 4 Sheets-Sheet 4
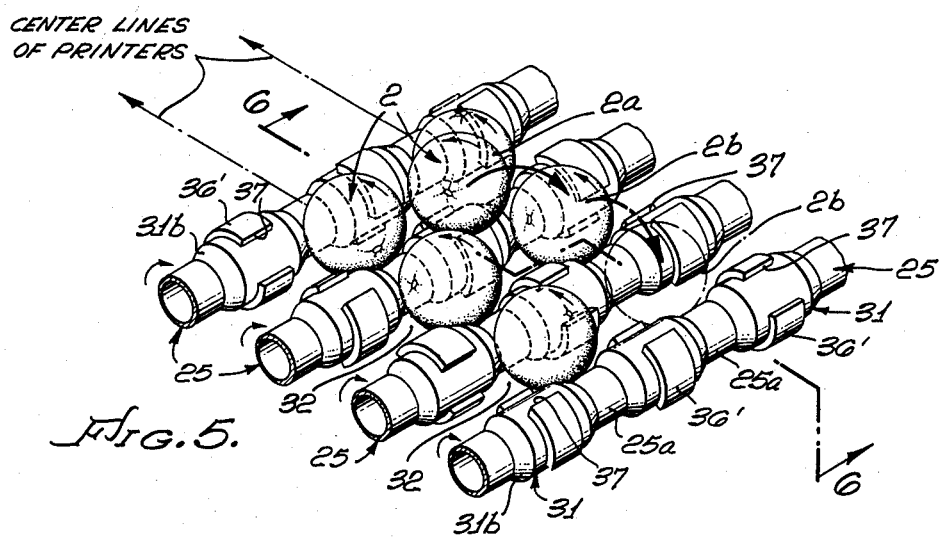
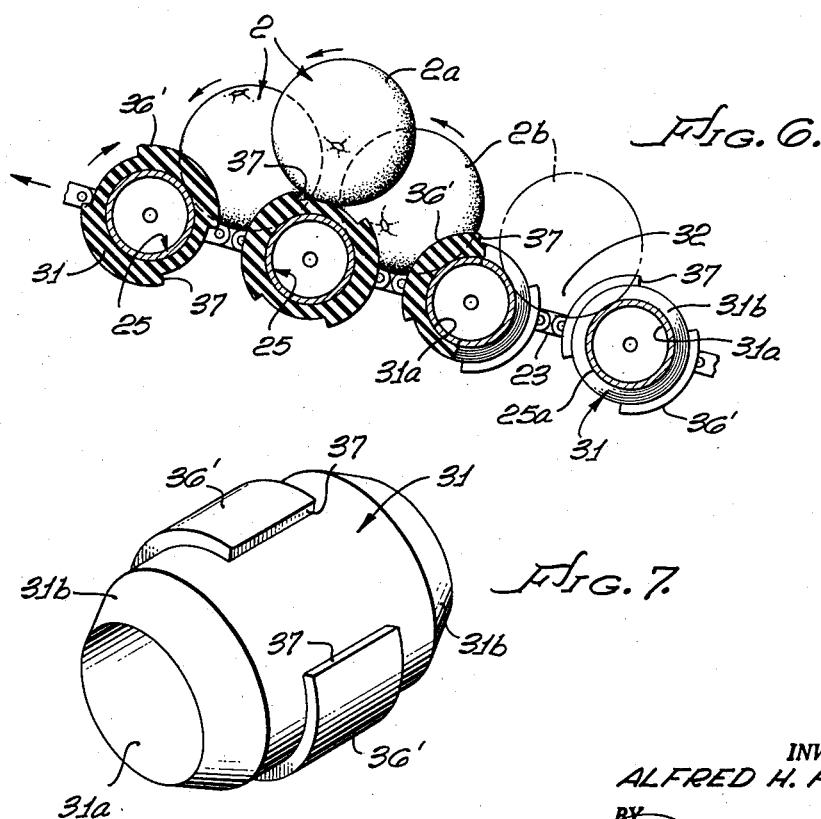
INVENTOR.
ALFRED H. FENNELL
BY Paul A. Weilein
ATTORNEY.

United States Patent Office 3,080,955
Patented Mar. 12, 1963

3,080,955
ARTICLE POSITIONING CONVEYOR
Alfred H. Fennell, Chino, Calif., assignor to Sunkist Growers, Inc., Los Angeles, Calif., a corporation of California
Filed May 9, 1960, Ser. No. 27,855
8 Claims. (Cl. 198—33)

This invention relates to the treatment of fruits, vegetables and similar products in preparation for the marketing thereof and more particularly to conveyor means for advancing such products to a station where the treatment is to be effected.

It is known that a conveyor having transversely disposed rotatable members has been used to advance citrus fruit to a station. In this apparatus the rotatable members are rotated in the same direction about their axes during the advance of the fruit and are spaced one from the other as well as provided with pocket forming members which define rows of pockets between the rotatable members. Each of these pockets is adapted to receive a single piece of the fruit, and during the advance of the rotatable members each citrus fruit of ellipsoidal form is generally oriented with its long axis extending parallel to the axis of the rotatable member. Thus, the conveyor is particularly well suited to deliver lemons or other ellipsoidal articles to a treating station, such as a printing station, where the fruit may be imprinted with a trademark or other indicia with the long axis of the articles disposed normal to the direction of travel of the articles so as to present to the printing rolls a circular cross-sectional zone.

However, when a quantity of fruit or other articles is deposited onto the conveyor, some of the articles may overlie articles that have entered the pockets, and other fruit articles may ride between the pocket forming members to one side of the pockets. While the rotation of the rotatable members is such that it tends to center the articles in the pockets and to position the articles in the pockets to have the indicia properly printed thereon, the fruit or other articles which due to crowding of the conveyor may lie between occupied pockets, merely spin or rotate and remain out of line with the printing rolls and tend to interfere with the proper presentation to the printing rolls of fruit seated in the pockets. This out-of-line positioning of the fruit or other articles results in improper marking or failure of marking of some of the fruit or other articles, as well as the likelihood in the case of fruits and vegetables for example of bruising or other damage by contact with the printing means. Heretofore, such crowding of the conveyor and improper positioning of the fruit or other articles has required special handling or surveillance of the conveyor.

It is therefore an object of this invention to provide an improved conveyor unit which will eliminate some of the objections and difficulties heretofore encountered in the advancing of citrus fruit and other articles to treating stations on a positioning conveyor to which the articles are supplied in a random bulk fashion.

It is another object of this invention to provide improved conveyor apparatus of the character described by means of which large quantities of citrus fruits, vegetables, nuts or other fruits and similar products or articles may be continuously advanced in a predetermined pattern, with each article in a predetermined position, to a treatment station where, for example, trademarks or other indicia may be printed on or applied to each product or where other treatment of each product may be effected, in all instances in an efficient manner assuring that each product will be properly and uniformly marked or effectively treated as required without damage.

It is a further object of this invention to provide in a conveyor of the character described novel means operable during advance of the fruit or other articles on the conveyor to cause articles positioned adjacent occupied pockets to be moved so as to enter unoccupied pockets.

It is an additional object of this invention to provide a conveyor such as described wherein the objectives herein noted may be achieved through the medium of simply constructed elements on the rotatable members of the conveyor, these elements being conveniently provided on the pocket forming members in an arrangement such that they will engage and move fruit or other articles into the pockets of the conveyor and effect a uniform distribution of the fruit in rows whereby each article will be subject to proper treatment at the treatment station to which the articles are conveyed.

While specific reference is made hereinafter to fruit, it is to be understood that while the conveyor is especially well suited to the handling of citrus fruit, the invention is also of advantage in the handling of a wide range of articles of produce or manufacture, with relative facility and efficiency.

Other objects and advantages of the invention will be hereinafter described or will become apparent to those skilled in the art, and the novel features of the invention will be defined in the appended claims.

Referring to the drawings:

FIG. 5 is a fragentary perspective view of a portion of the conveyor shown in FIG. 1 illustrating movement of fruit thereon;

FIG. 6 is a sectional view taken on the line 6—6 of FIG. 5; and

FIG. 7 is a perspective view of one of the pocket forming members shown in FIGS. 5 and 6, and showing the fruit distributing means thereon for moving fruit into the pockets in the manner indicated in FIGS. 5 and 6.

Figure 1:
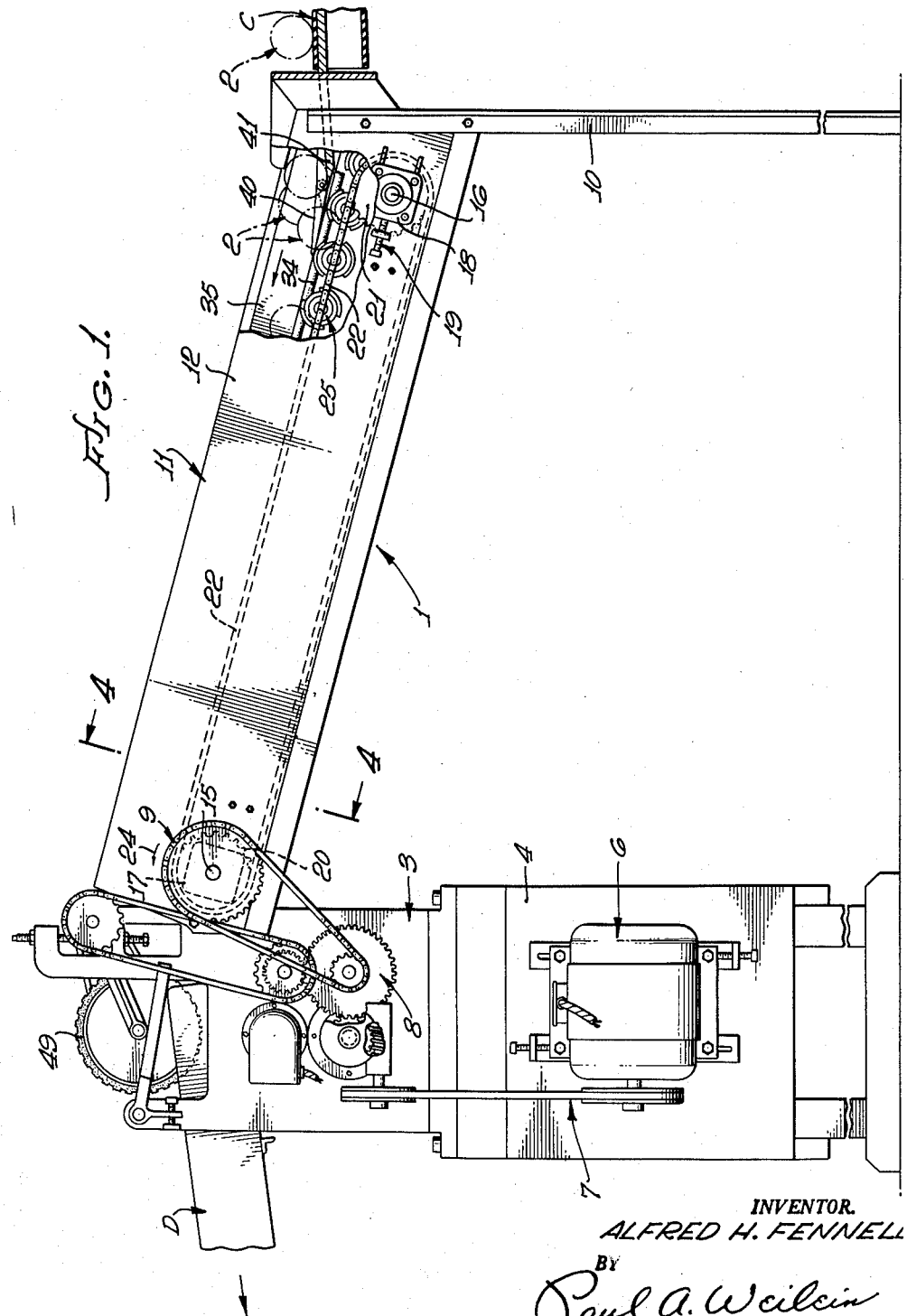
FIG. 1 is a side elevation of apparatus embodying the present invention with portions thereof broken away and other portions shown in section for clarity of illustration, the apparatus being shown as employed for conveying citrus fruit and similar products to a printing machine for marking indicia on such products.

The illustrative embodiment of this invention includes a conveyor 1 which is shown in the accompanying drawings as operable for conveying fruit, for example, citrus fruit 2, from a suitable source such as a supply conveyor C, to a machine 3 for performing a desired function such as cutting and juicing or otherwise treating, wrapping, or as in the illustrative case, printing on the fruit suitable indicia such as trademarks, grade designations or other identifying marks.

The printing machine 3 here shown, although forming no part of the present invention, has certain elements thereof which cooperate with the conveyor 1. Generally the printing machine includes an upright frame or stand 4 supporting adjacent the upper end thereof a horizontal row of printing rolls 5, each of which is operable to print indicia on each piece of fruit delivered to the machine by the conveyor 1 in the particular manner which will be hereinafter described.

An electric motor 6 is supported by the frame 4 for operating the printing mechanism through a belt and pulley drive means 7 and drive gearing 8. It is not deemed necessary to describe in detail the construction and mode of operation of the printing machine 3 since this machine is well known in this art, and is but one of known machines that may be used in the same manner as here shown. However, it should be noted that the motor 6 of the printing machine as here shown may be employed to operate the conveyor 1, and in such case the conveyor may be operated through a chain and spocket drive means 9 driven by the drive gearing 8 of the printing machine. With this arrangement it is apparent that the operation of the conveyor 1 and the printing rolls readily may be synchronized to insure the printing of the indicia on the fruit in the manner shown in FIG. 3, and as will be hereinafter described.

The conveyor 1 as shown herein, is connected at one end with the printing machine 3 so as to be inclined upwardly from the other end thereof. The lower end is appropriately supported as by means of legs 10. In this connection it should be noted that the conveyor will operate efficiently while level or substantially level, although for some fruits an inclination, for example from 5 to 20 degrees from the horizontal, has been found to give the desired results. Accordingly, it is apparent that the inclination of the conveyor may be varied best to suit the particular fruit or product.

In accordance with this invention the conveyor 1 includes a rectangular frame 11 comprising a pair of opposed side members 12 and suitable skelton reinforcing members 13 suitably joined to and disposed between the side members 12, there being shafts 15 and 16 extending across the opposite ends of the frame 11 and mounted in suitable bearings 17 and 18. The bearings 18 are adjustable longitudinally on the side members 12 in response to operation of adjusting means 19. Pairs of sprockets 20 and 21 are mounted at opposite ends of the shafts 15 and 16, respectively, for rotation therewith and support chains 22 and 23, the adjustment of the bearings 18 providing for proper tension of the sprocket chains.

As shown in FIG. 1, the shaft 15 of the conveyor may be driven by the chain and sprocket means 9 and in this way the chains 22 and 23 are driven in a manner indicated by the arrow 24 in FIG. 1.

Figure 4:
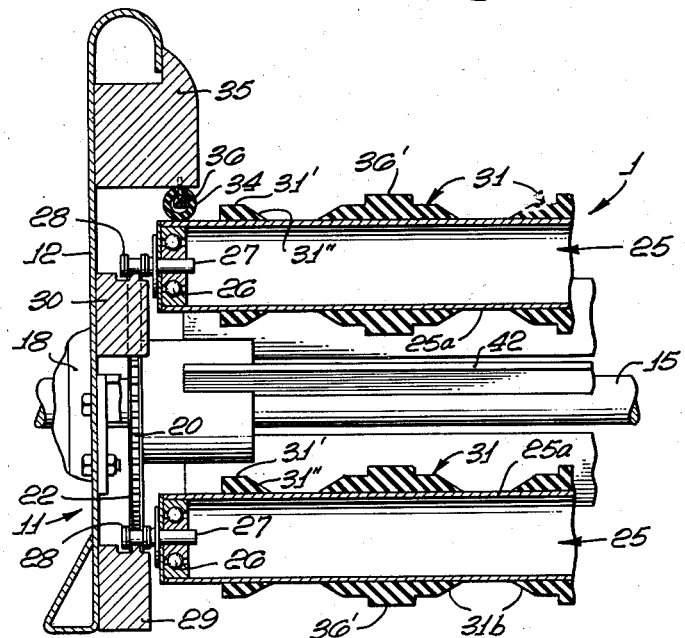
FIG. 4 is a sectional view taken on the line 4—4 of FIG. 1 on an enlarged scale.

The conveyor 1 comprises a series of transversely disposed rotatable members 25 in the form of elongated cylindrical tubes or rollers. Each member 25, as shown in FIG. 4, is provided at its ends with anti-friction bearings 26 in which are supported pintles 27 fixed to the links 28 of the sprocket chains 22 and 23, whereby each member 25 is freely rotatably supported by and between the chains. Between the sprockets 20 and 21 on the shafts 15 and 16 the upper and lower runs of the chains 22 and 23 are supported on parallel elongated guide rails 29 and 30 bolted or otherwise secured to the side members 12 of the conveyor frame.

In order that the fruit or other products may be supported on the conveyor between the rotatable members 25, the rotatable members 25 are parallel and spaced one from the other longitudinally of the conveyor, this spacing being such that the fruit or other products disposed on the upper run of the conveyor will be supported by and between the members 25 in transversely extended rows.

It is desired that each piece of fruit conveyed to the printing machine will be disposed in line with one of the printing rolls 5, and for this purpose each of the rotatable members 25 is provided with a series of pocket forming members or spools 31 longitudinally spaced thereon. Also mounted on the ends of each member 25 are fragmentary pocket forming members or spool sections 31'. These spools and spool sections on adjacent members 25 cooperate to provide a series of pockets 32 arranged in rows extending longitudinally of the conveyor with each row in alignment with one of the printing rolls 5 of the printing machine.

Each spool 31 is in the form of a sleeve preferably formed of rubber or similar material to avoid injury of the fruit, and is provided with an axial bore 31a and beveled ends 31b. The sectional end spool members 31' have beveled inner ends 31", and like spools 31, are frictionally held or otherwise secured on the members 25. By reason of the beveled ends 31b and 31" and the spacing of the members 25, there are formed between the beveled ends of adjacent and opposed spools 31 and 31' and the opposed portions 25a of the rotatable members 25 exposed between these beveled ends, the rows of pockets 32, as will be apparent with reference to FIGS. 2, 5 and 6. The spacing of the rotatable members 25, and, of course, the spacing and size of the pocket forming members or spools 31 and 31' thereon are such that each pocket 32 is adapted to support a single piece of fruit or a single other article, as the case may be, the fruit or product either resting on the beveled ends 31b of adjacent members 31, or being supported on the opposed portions 25a of the members 25, depending upon the size thereof, the purpose being to provide pockets which will maintain each piece of fruit or article in alignment with one of the printing rolls.

Figure 3:
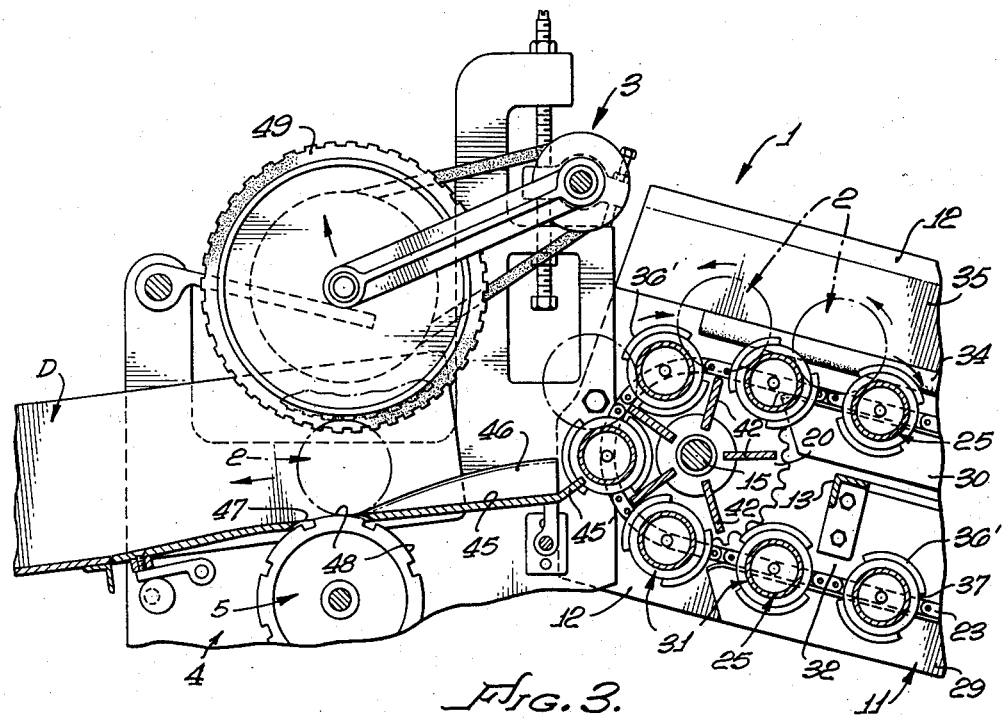
FIG. 3 is a sectional view taken on the line 3—3 of FIG. 2 on an enlarged scale.

It has been found that by effecting rotation of the rotatable members 25 about their axes on the upper run of the conveyor, the fruit or other articles supported in the pockets 32, particularly ovate or ellipsoidal fruit, will be positioned in the pockets in the most favorable manner to have the indicia printed thereon when released from the upper end of the conveyor onto the printing machine. In this connection it is desirable to position ellipsoidal fruit such as lemons with their major or stem end to blossom end axes extending transversely of the conveyor so as to expose a circular cross sectional zone of the fruit to the printing rollers. In the illustrative embodiment rotatable members 25 on the upper run of the conveyor are rotated about their axes in a direction so that the fruit in the pockets will be rotated in a direction toward the printing machine. Thus, as shown in FIGS. 3, 5 and 6, these rotatable members 25 are rotated about their axes in a clockwise direction, and this causes the fruit to be rotated in a counterclockwise direction or toward the upper end of the conveyor while remaining in the pockets 32. This rotation of the rotatable members 25 may be effected in any suitable manner, but as here shown, is accomplished by frictional engagement of the end portions of the rotatable members on the upper run of the conveyor with tubular friction drive members 34 made of rubber or the like and fixed on elongated rails 35 in turn bolted or otherwise secured to the inner sides of the side members 12 of the frame 11. Each of the friction drive members 34 has a reinforcing rod 36 therein to maintain it in a condition to engage and cause rotation of the members 25 on the upper run of the conveyor as the latter advances toward the printing machine.

In accordance with this invention, provision is made for effectively distributing fruit deposited onto the upper run of the conveyor 1 from the supply conveyor C so that during movement of the fruit to the printing machine, substantially all of the fruit will be positioned in the pockets 32. It has been found that without some means provided specifically for effecting distribution of the fruit into the pockets, some of the fruit will overlie fruit already seated in the pockets 32 and other of the fruit will be supported on the pocket forming members to one side of the pockets. The fruit thus disposed to one side of the pockets or over fruit already seated in the pockets is out of line with the printing rollers and may not be printed or may be improperly printed or in some instances may be bruised by contact with the printing machine. Accordingly, means for engaging and distributing the fruit is here shown as embodied in the pocket forming members or spools 31 so that during rotation of the pocket spools with the rotatable members, the distributing means will engage and move the misaligned fruit to cause it to be positioned in unoccupied pockets on the conveyor.

This is accomplished by having a portion of each of the pocket forming members formed to engage and move fruit not disposed in the pockets. In the illustrative embodiment one or more arcuate ribs 36' is provided on the periphery of each member 31 intermediate the ends of the latter so that the ends of the ribs provide radially projecting shoulders 37 extending longitudinally of the rotatable members for contacting the fruit not in the pockets and causing it to be moved about so as to enter unoccupied pockets. The shoulders 37 moving toward the fruit during rotation of the members 25 are in effect radial projections for engaging the fruit. Thus, any means forming a projection which will function in the manner of the shoulders is considered to be within the scope of this invention. However, it is desired that the distributing shoulders 37 or equivalent means be formed and located so as not to interfere with normal settling of the fruit into the pockets 32, and for this reason the shoulders 37 are to one side of the rows of pockets 32, but in a position for effecting the distribution of the fruit.

Figure 2:
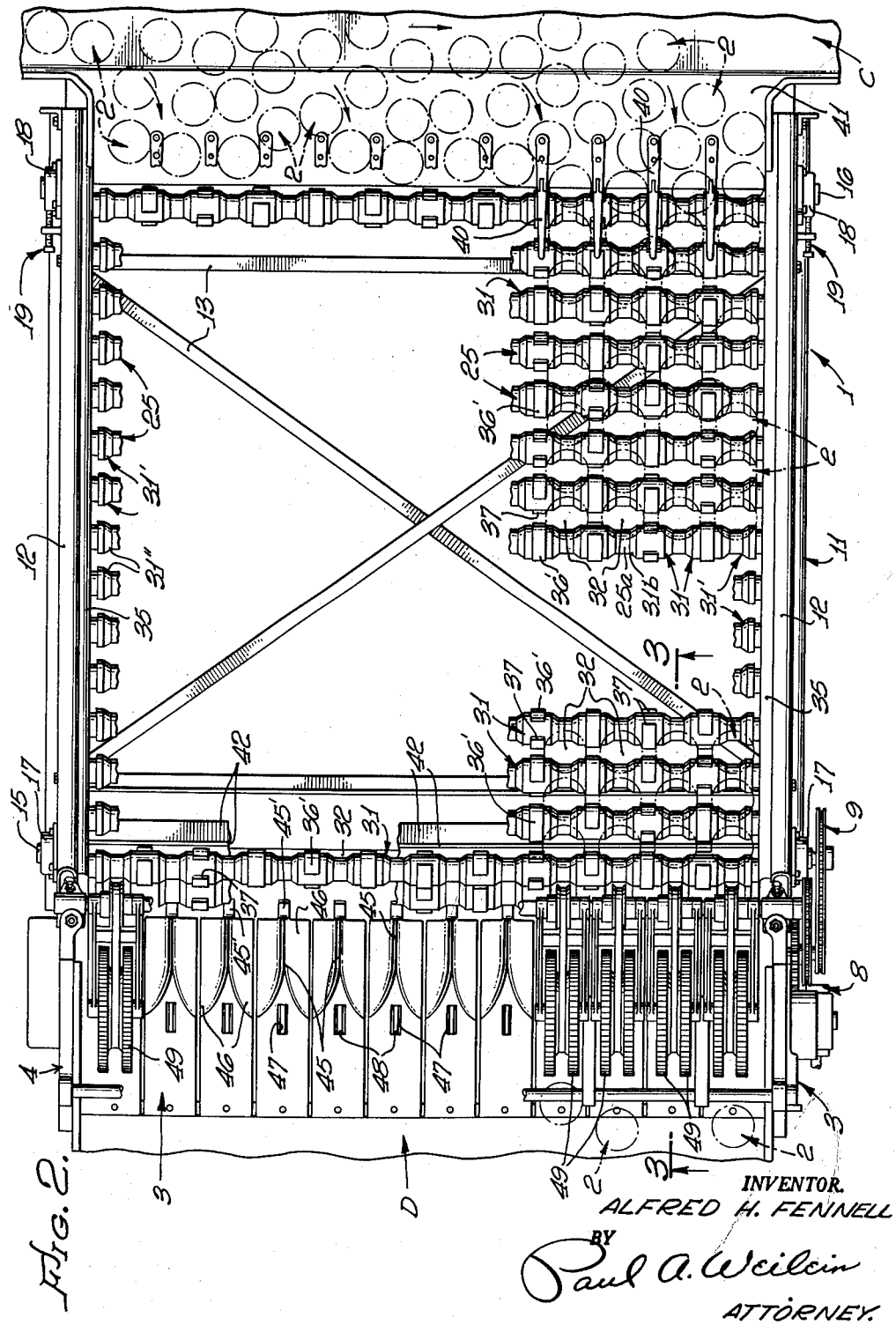
FIG. 2 is a fragmentary plan view of the apparatus shown in FIG. 1.

It should be noted that the fruit distributing shoulders 37 provided in accordance with this invention on the pocket forming members or spools 31 assure that large quantities of fruit placed on the conveyor 1, either by means of the supply conveyor designated C as shown in FIGS. 1 and 2, or by any other means, will be delivered to the printing machine in a manner such that an expeditious and accurate marking of large quantities of fruit will be effected at low cost and with a minimum amount of handling. Further, it should be noted that these distributing shoulders 37 or equivalent means are highly essential in view of the fact that it may be preferred not to grade the fruit to one specific size before placing it on the conveyor. Consequently, each of the pockets 32 preferably is of such size as to accommodate a single piece of fruit of different sizes over a reasonable range with the result that where fruit pieces of differing sizes are deposited on the conveyor, there is a tendency for a greater amount of the fruit to be carried to one side of the pockets or between filled pockets and, therefore, without the shoulders 37 operating as here provided, this misaligned fruit would not be properly delivered to the printing machine or a treatment station.

If desired, guiding fingers 40 may be mounted on a table 41 over which the fruit is passed, as shown in FIG. 1, from the conveyor C onto the upper run of the conveyor 1, these fingers defining guideways therebetween so that rows of fruit will be delivered onto the conveyor. However, this guide means is not depended upon since it is apparent that a quantity of fruit deposited on the receiving end of the upper run of the conveyor in a random manner, will be seated in the pockets and distributed by the shoulders 37 so that during operation of the conveyor substantially all the fruit will be properly seated in the pockets.

Means are embodied in the conveyor 1 to assure that the fruit will be delivered properly from the discharge end thereof into the printing machine 3. For this purpose the upper shaft 15 of the conveyor is provided with a series of vanes 42 extending radially therefrom the full width of the conveyor so that the outer edges of these vanes will be disposed between the pocket forming members 31 and the rotatable members 25 in position to prevent the fruit from being held in the pockets 32 when the rotatable members 25 describe an arcuate path about the shaft at the discharge end of the conveyor.

The pockets 32 formed by the pocket forming members 31 will increase in size somewhat as these members describe an arcuate path in turning about the axis of the shaft 15 and the vanes 42 will then prevent smaller fruit from dropping through the pockets as well as prevent any fruit in the pockets from wedging and being held therein. Thus the vanes 42 assure that the fruit will be deposited in the desired position into the printing machine.

As shown in FIG. 3, the printing machine 3 has a series of guide chutes 45 disposed in line with the rows of pockets 32 on the conveyor 1, as well as in line with the printing rolls 5. Each guide chute 45 has an upturned tongue 45' at the entrance thereof which will extend into pockets 32 to assure proper ejection of the fruit into the printing machine. Consequently, as the fruit is discharged from the conveyor onto the chutes 45, it will roll, guided by the side members 46 of the chutes, into a position over an opening 47 in the chutes where the printing elements 48 of the printing rolls 5 are engageable with the fruit. Coincident with the fruit rolling into this position, a row of pressure rolls 49 on the machine are operable to press the fruit against the printing roll so that the desired indicia will be printed upon the fruit. The pressure rolls are moved, as is customary in machines of this character, into and out of position engaging the fruit in timed relation to the operation of the printing rolls, and after each printing operation the released fruit will roll down onto a discharge chute D, as shown in FIGS. 1 and 3.

It is important to note that the fruit distributing shoulders 37, as provided in accordance with this invention, will distribute fruit on the conveyor in the manner indicated in FIGS. 5 and 6, wherein a piece of the fruit designated 2a is shown as supported on top of one of the pocket forming members 31 between four adjacent occupied pockets 32. This piece of fruit will be engaged by one of the shoulders 37 on the pocket forming member 31 supporting it, as this pocket forming member is rotated in a clockwise direction during operation of the conveyor and will be moved off the pocket forming member on which it is supported in a direction toward the receiving end of the conveyor. It has been observed in actual operation of a conveyor as here shown, that in some instances the fruit piece 2a will be moved upon being encountered by a shoulder 37 in such a manner that it will dislodge a fruit piece, for example, the adjacent fruit piece 2b from its pocket and move it into an adjacent pocket 32 as indicated by the dotted showing of piece 2b, the fruit piece 2a then occupying the pocket formerly occupied by the fruit piece 2b. This is but one example of how fruit not in the pockets 32 may be distributed to enter unoccupied pockets since it is obvious that fruit pieces situated on the conveyor, like the piece 2a shown in FIGS. 5 and 6, will be moved laterally or otherwise by the shoulders 37 so that they will roll into unoccupied pockets during operation of the conveyor.

Thus, it is apparent that the invention provides an article transferring and positioning conveyor having a plurality of article positioning pockets and means, shoulders 37, for displacing articles from locations between occupied pockets so as to enhance uniform article distribution. With the conveyor inclined in the direction of its discharge end, and with the rotatable elements rotating in a clockwise direction, as shown in FIG. 6, for example, the articles which are not positioned or pocketed will be agitated and generally displaced towards the article-receiving end of the conveyor so as to preclude jamming of articles at the work station or printing machine at the discharge end of the conveyor.

While specific structural details have been shown and described, it should be understood that changes and alterations may be resorted to without departing from the spirit of the invention as defined in the appended claims.

I claim:

1. An endless conveyor comprising a plurality of rotatable members extending transversely and forming the runs of the conveyor; said rotatable members being spaced one from the other to support articles therebetween on the upper run of the conveyor; means on said conveyor forming pockets between said rotatable members arranged to extend in predetermined rows longitudinally of the upper run of the conveyor; means for rotating said rotatable members of said upper run about their axes; and distributing members carried by said conveyor out of alignment with said pockets and spaced one from the other transversely of the conveyor as well as in the direction of advance of said upper run and operable during rotation of said rotatable members for engaging and distributing said articles over said upper run into said pockets.

2. An endless conveyor comprising a plurality of rotatable members forming the runs of the conveyor; means for rotating said rotatable members about their axes; pocket forming members mounted on said runs of the conveyor cooperable with said rotatable members and defining therebetween rows of pockets for receiving articles; and means extending from said pocket forming members between said pockets for engaging and moving into pockets of said rows articles placed on said conveyor.

3. An endless conveyor comprising a plurality of rotatable members extending transversely and forming the runs of the conveyor; said rotatable members being spaced one from the other along said conveyor to support articles therebetween; means for rotating said rotatable members about their axes in the direction opposite that of movement of the conveyor; pocket forming members axially spaced one from the other along each of said rotatable members; said pocket forming members providing in cooperation with said rotatable members rows of pockets extending longitudinally of the conveyor and spaced laterally one from the other; and a formation on each of said pocket forming members providing a surface extending radially therefrom on the periphery thereof; said surfaces on said pocket forming members being operable for engaging and moving said articles into pockets of said rows during said rotation of said rotatable members.

4. An endless conveyor comprising a plurality of rotatable members forming the upper and lower runs of the conveyor; means for rotating said rotatable members on said upper run about their axes during advance of said upper run; pocket forming members mounted on said rotatable members and providing rows of pockets for reception of articles; said pocket forming members being annular and mounted about said rotatable members; and a formation on each of said pocket forming members providing a surface extending radially and axially on the periphery thereof; said radial surfaces being operable during said rotation of said rotatable members to engage and distribute said articles into said pockets of unoccupied rows.

5. An endless conveyor comprising a plurality of rotatable members; means for rotating said rotatable members of the upper run of the conveyor about their axes during said advance; a plurality of tubular members surrounding each of said rotatable members in axially spaced relation one to the other; said tubular members having beveled ends forming rows of pockets for reception of articles; and formations on the peripheries of said tubular members located intermediate said beveled ends providing surfaces disposed to one side of said pockets and operable during rotation of said rotatable members to engage and move into unoccupied pockets in said rows those of said articles disposed to one side of said pockets of said rows.

6. In an endless conveyor for advancing a group of articles on the upper run thereof: means including a plurality of rotatable members forming the upper and lower runs of the conveyor; said rotatable members being spaced one from the other in the direction of advance of said articles to support said articles therebetween; means for rotating said rotatable members about their axes during operation of the conveyor; article positioning means carried by said conveyor cooperable with said rotatable members to dispose articles in laterally spaced rows extending longitudinally on said upper run during said advance; said article positioning means including retaining members carried by said conveyor for retaining said articles in said rows; and distributing members carried by said conveyor for moving into position to be retained between said retaining members during rotation of said rotary members, articles on said upper run which are out of line with articles retained in rows by said retaining members.

7. An article positioning conveyor comprising a series of elongated rotatable members disposed in parallel relation; means for moving said members successively from an article receiving position to an article discharging position; means for rotating each member about its axis as it moves towards said article discharging position; said members having equidistantly spaced circular parts projecting therefrom and forming rows of article receiving pockets between opposed portions of adjacent members; and an outstanding radial surface disposed between said circular parts.

8. An endless article positioning conveyor comprising: an endless carrier; rotatable means forming transversely spaced aligned rows of pockets along said conveyor for receiving articles; and means between said pockets for displacing articles into said pockets; said displacing means comprising a member revolvable about the axis of said rotatable pocket forming means and having a radially extended face disposed transversely of the conveyor.

References Cited in the file of this patent
UNITED STATES PATENTS

| 100,710 | Bachelder | Mar. 15, 1870 |
|---|---|---|
| 2,268,803 | Cowl | Jan. 6, 1942 |
| 2,596,798 | Thompson | May 13, 1952 |
| 2,713,934 | Amori | July 26, 1955 |
| 2,830,531 | Tarlton | Apr. 15, 1958 |
| 2,961,087 | Reading | Nov. 22, 1960 |

UNITED STATES PATENT OFFICE
CERTIFICATE OF CORRECTION

Patent No. 3,080,955  March 12, 1963

Alfred H. Fennell

It is hereby certified that error appears in the above numbered patent requiring correction and that the said Letters Patent should read as corrected below.

Column 7, lines 44 and 45, for "said pockets of unoccupied rows." read -- unoccupied pockets of said rows. --.

Signed and sealed this 22nd day of October 1963.

(SEAL)
Attest:

ERNEST W. SWIDER
Attesting Officer

EDWIN L. REYNOLDS

Acting Commissioner of Patents